Figure 1:
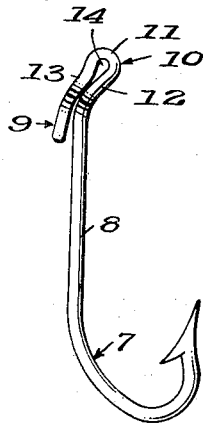

Nov. 29, 1938.    R. G. LITSEY    2,138,702
LINE COUPLER
Filed March 14, 1936

Inventor
ROBERT G. LITSEY

By Kimmel & Crowell
Attorneys

Patented Nov. 29, 1938

2,138,702

UNITED STATES PATENT OFFICE 2,138,702

LINE COUPLER

Robert G. Litsey, Fort Worth, Tex.

Application March 14, 1936, Serial No. 68,933

1 Claim. (Cl. 43—28)

This invention relates to a line coupler for the use of fishermen, and has for its object to provide, in a manner as hereinafter set forth, a means for facilitating the connecting and disconnecting of a fishing line to and from a hook or a lure when occasion requires.

Further objects of the invention are to provide, in a manner as hereinafter set forth, a fishing line coupler which is simple in its construction, strong, durable, compact, thoroughly efficient in its use, permitting for conveniently attaching and detaching a fishing line when desired, overcoming the inconvenience of tying the line to a fishing appliance and inexpensive to manufacture.

With the foregoing and other objects which may hereinafter appear, the invention consists of the novel construction, combination and arrangement of parts as will be more specifically described and as are illustrated in the accompanying drawing wherein is shown an embodiment of the invention, but it is to be understood that changes, variations, and modifications may be resorted to which fall within the scope of the invention as claimed.

Figure 2:
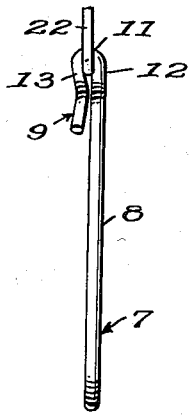
Figure 3:
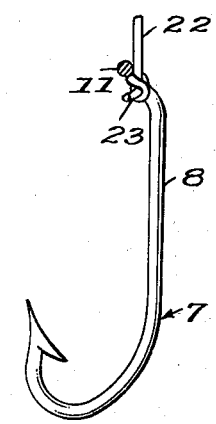
Figure 4:
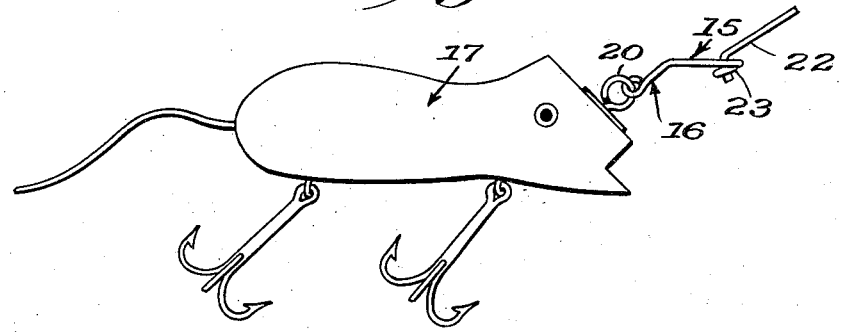
Figure 5:
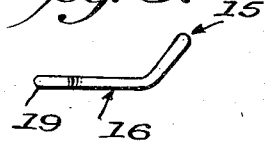
Figure 6:
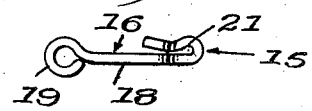

In the drawing:

Figures 1, 2 and 3 are respectively a perspective view, an edge view and a side elevation of a fishing appliance in the form of a fishing hook having installed therewith a fishing line coupler, in accordance with this invention, Figure 4 is a side elevation of a fishing lure having installed therewith a fishing line coupler, in accordance with this invention, Figure 5 is an edge view of an attaching member employed in connection with a fishing appliance in the form of a lure and with said member being provided with a fishing line coupler, in accordance with this invention, and Figure 6 is a top plan view of the element shown in Figure 5.

With reference to Figures 1, 2 and 3, a fishing hook is generally indicated at 7. The shank of hook 7 is designated 8.

A fishing line coupler, in accordance with this invention, is generally indicated at 9, Figures 1, 2 and 3, and forms an integral continuation of the shank 8. The coupler 9 is formed from a single length of spring wire 10 of the desired gauge and length. The wire 10 is bent upon itself to form a leading stretch 11 of arcuate contour, an inner side follower stretch 12 of compound curvature and an outer side follower stretch 13 of ogee curvature of greater length than the stretch 12. The ends of the stretch 11 merge into the leading ends of the stretches 12, 13. The stretch 11 is disposed at an inclination with respect to the plane of the shank 8. The follower end of the stretch 11 merges into that end of the shank 8 opposite that shank end which merges into the bill of hook 7. The stretch 13 extends rearwardly beyond the point of mergence of the stretch 12 with shank 8. The stretch 11, in connection with the leading portions of the stretches 12, 13, provides a split flared loop 14 which is maintained substantially closed by an intermediate portion of the stretch 13 being positioned in close proximity to the rear end portion of the stretch 12.

The stretch 12 is disposed inwardly and at a forward inclination with respect to the shank 8. The leading portion of the stretch 13 is disposed inwardly and at a forward inclination with respect to the shank 8. The follower portion of the stretch 13 inclines away from the leading end of shank 8, or in other words, inclines away with respect to the point of mergence of shank 8 with stretch 12. The stretches 12, 13 are disposed at oblique angles with respect to the point of mergence of the follower end of stretch 12 with the leading end of the shank 8, and the location of such point of mergence in relation to the stretch 13 is intermediate the ends of the latter.

The loop 14 extends forwardly at an outward inclination with respect to the leading end of shank 8 and is disposed substantially at an angle of approximately 45° as shown in Figure 3. This arrangement has been found very advantageous in that it prevents the tangling of the line by the hook and further it provides for the latter to hang from the line in a much more practical position. If the loop were straight with the shank, the line would tend to hold the hook somewhat more horizontally than as shown in Figure 3, then further if the loop is formed approximately at right angles with respect to the shank an awkward construction would be set up which might result in injury to the fingers of the fisherman in manipulation thereof. The arrangement of the loop at about approximately 45° is found to be very advantageous and a distinct advance in the art.

The fishing line coupler is indicated generally at 15 in Figures 4, 5 and 6 and is of the same construction as the coupler 9, but it is shown as being employed in connection with an attaching member 16 for a lure 17. The attaching member 16 includes a shank 17 terminating at one end with an eye 19 connected to a ring 20 anchored to an end of the lure 17. The other end of shank 18 merges into the inner side follower stretch 21 of the coupler 15. The latter is angularly disposed throughout and, as shown, extends laterally and at an upward inclination to the shank 18.

The fishing line is indicated at 22 and is provided with a knot 23. When the coupler is used to perform its coupling function, the line is passed through the loop of the coupler and is to snugly bind against the walls of the loop in the leading end of the coupler. The loop is of such dimensions as to have the wall thereof bind against the line. The knot is to abut one side of the coupler. When uncoupling, the line may be passed from the coupler by moving it out between the rear terminal portions of the stretches 12, 13.

What I claim is:

In a fishing line coupler, a one-piece resilient body formed of a straight follower stretch constituting a shank, a leading stretch of arcuate contour spaced from the leading end of the shank, an inner side follower stretch of compound curvature merging at its follower end into the leading end of said shank and at its leading end into one of the ends of said leading stretch and an outer side follower stretch of ogee curvature of greater length than the inner side follower stretch and merging at its leading end into the other of the ends of said leading stretch, said inner and outer side follower stretches, intermediate their ends being disposed in substantially abutting relation, the said outer side follower stretch having that part thereof rearwardly of its part which substantially abuts the inner side stretch extending rearwardly beyond the point of mergence of the inner side stretch with the shank and spaced from the latter, said leading stretch and the leading portions of the outer and inner side follower stretches coacting to form a flared split loop for passage of the line, said loop being maintained substantially closed by the intermediate part of said outer side follower stretch, and said outer and inner side follower stretches being disposed throughout at oblique angles with respect to the point of mergence of the inner side follower stretch with the shank to position the loop at an angle of approximately 45°.

ROBERT G. LITSEY.